United States Patent [19]

Prinz

[11] 4,021,172
[45] May 3, 1977

[54] EXTRUSION APPARATUS FOR FOIL-COVERED, HOLLOW PLASTIC BODIES

[75] Inventor: Erich Prinz, Aichelberg, Germany

[73] Assignee: Plastic & Form Kunststoff-Verarbeitungs-GmbH, Wendlingen, Germany

[22] Filed: May 12, 1975

[21] Appl. No.: 576,341

[30] Foreign Application Priority Data

May 31, 1974 Germany .......................... 2426543

[52] U.S. Cl. ................................. 425/113; 264/209; 425/325; 425/374; 425/380; 425/467
[51] Int. Cl.² .......................................... B29F 3/04
[58] Field of Search ..................... 156/244, 500; 264/176 R, 209; 425/380, 381, 467, 113, 114, 328, 505, 516, 325, 374, 404

[56] References Cited

UNITED STATES PATENTS

| | | | |
|---|---|---|---|
| 1,197,326 | 9/1916 | Ackerman | 425/113 |
| 2,382,177 | 8/1945 | Schanz | 425/131.1 |
| 2,696,640 | 12/1954 | Wienand | 425/114 X |
| 3,792,951 | 2/1974 | Meyers | 425/467 X |
| 3,895,898 | 7/1975 | Theysohn | 425/325 |
| 3,915,616 | 10/1975 | Nackaerts | 425/467 |

*Primary Examiner*—Ronald J. Shore
*Assistant Examiner*—Mark Rosenbaum
*Attorney, Agent, or Firm*—Hans Berman

[57] ABSTRACT

To cover at least one face of an extruded, hollow, plastic body, the front face of the extruder die is formed with a recess in which a cylindrical roller is rotatably mounted contiguously adjacent the die orifice. The roller defines a first portion of a feed channel for a foil with the die wall in the recess and a second channel portion, tangential to the first, with the mandrel which defines an extrusion gap in the die orifice. The foil may be draped about side faces of the mandrel by pressure rollers if the extrudate is backed by mandrel portions extending to the pressure rollers.

3 Claims, 4 Drawing Figures

EXTRUSION APPARATUS FOR FOIL-COVERED, HOLLOW PLASTIC BODIES

This invention relates to the extrusion of hollow, plastic shapes, and particularly to apparatus for producing foil-covered, hollow, plastic bodies.

It is often desirable to cover strands of extruded plastic with foils of decorative material or of a material which protects the underlying extruded material against the environment. It is simple enough to apply a foil of any kind of material to the extrudate as it leaves the shaping die if the extruded shape is solid, that is, substantially free of internal cavities. Even when hot immediately after release from the die, such an extrudate is sufficiently strong to accept a foil without significant deformation under the pressure necessary for affixing the foil to the substrate. Hollow extrudates heretofore could be covered with foil only after the extruded thermoplastic material had gained strength by cooling, and usually after the continuous extruded strand had been cut into individual lengths.

It is the primary object of this invention to provide extrusion apparatus which permits foil to be affixed to the extrudate in continuous operation while it is still hot and readily deformable as it leaves the extrusion die.

For this purpose, the invention provides extrusion apparatus including a die member formed with a passage extending therethrough and having a front face transverse to the passage which terminates in an orifice in the front face. A mandrel member is secured in the passage in such a manner that it defines an extrusion gap in the orifice. The front face of the die member is formed with a recess contiguously adjacent the orifice. The cross section of the recess is approximately cylindrically arcuate about an axis transverse to the direction of extrusion through the orifice. A cylindrical roller is mounted in the recess for rotation about its axis. It defines a first portion of a channel with the die member in the recess, and a second portion with the mandrel member, the width of the second channel portion being approximately equal to the combined corresponding widths of the extrusion gap and of the first channel portion. The foil intended for coating the extrudate is fed to the first channel portion.

Other features, additional objects, and many of the attendant advantages of this invention will readily be appreciated as the same becomes better understood by reference to the following detailed description of preferred embodiments when considered in connection with the appended drawing in which.

Figure 1:
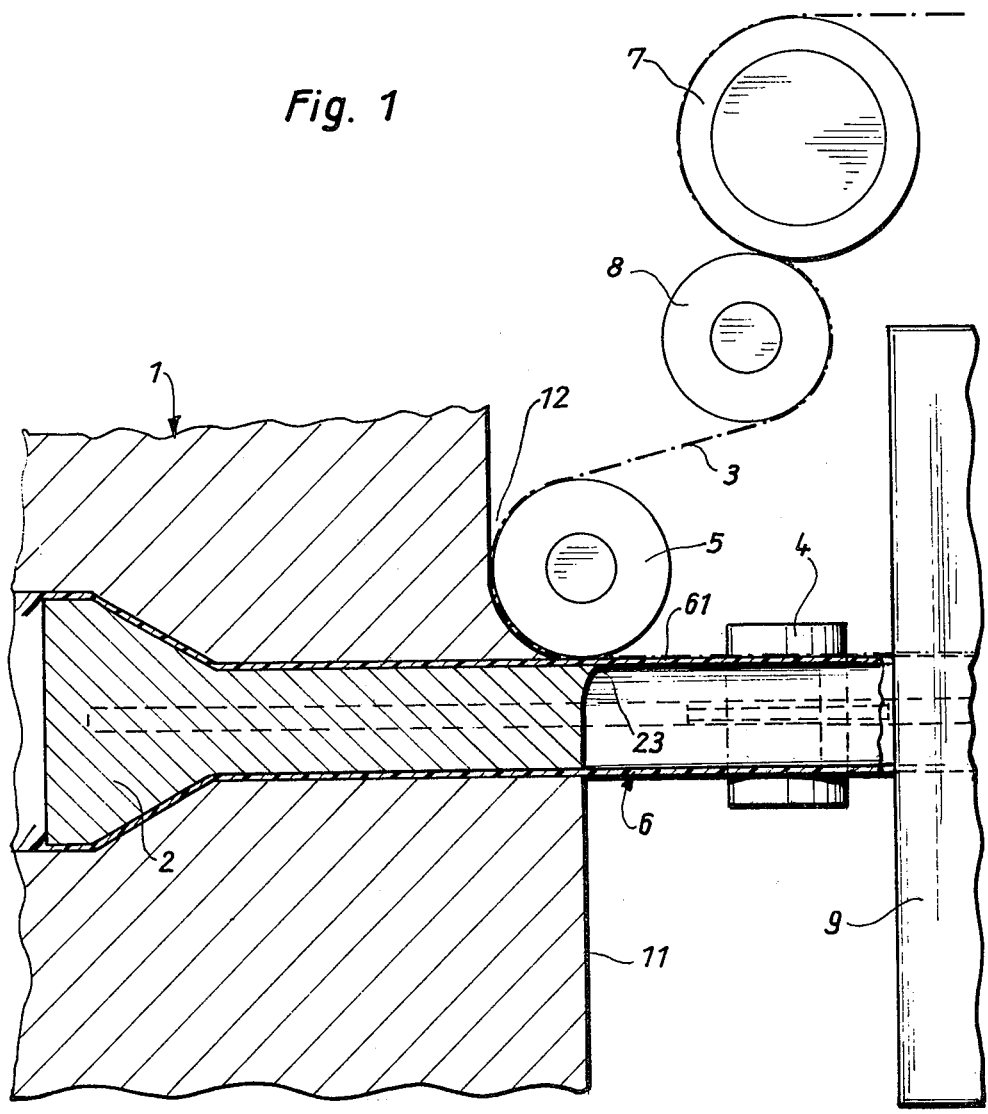
FIG. 1 shows apparatus of the invention in side-elevational section on a plane corresponding to the plane I — I in FIG. 2.
Figure 2:
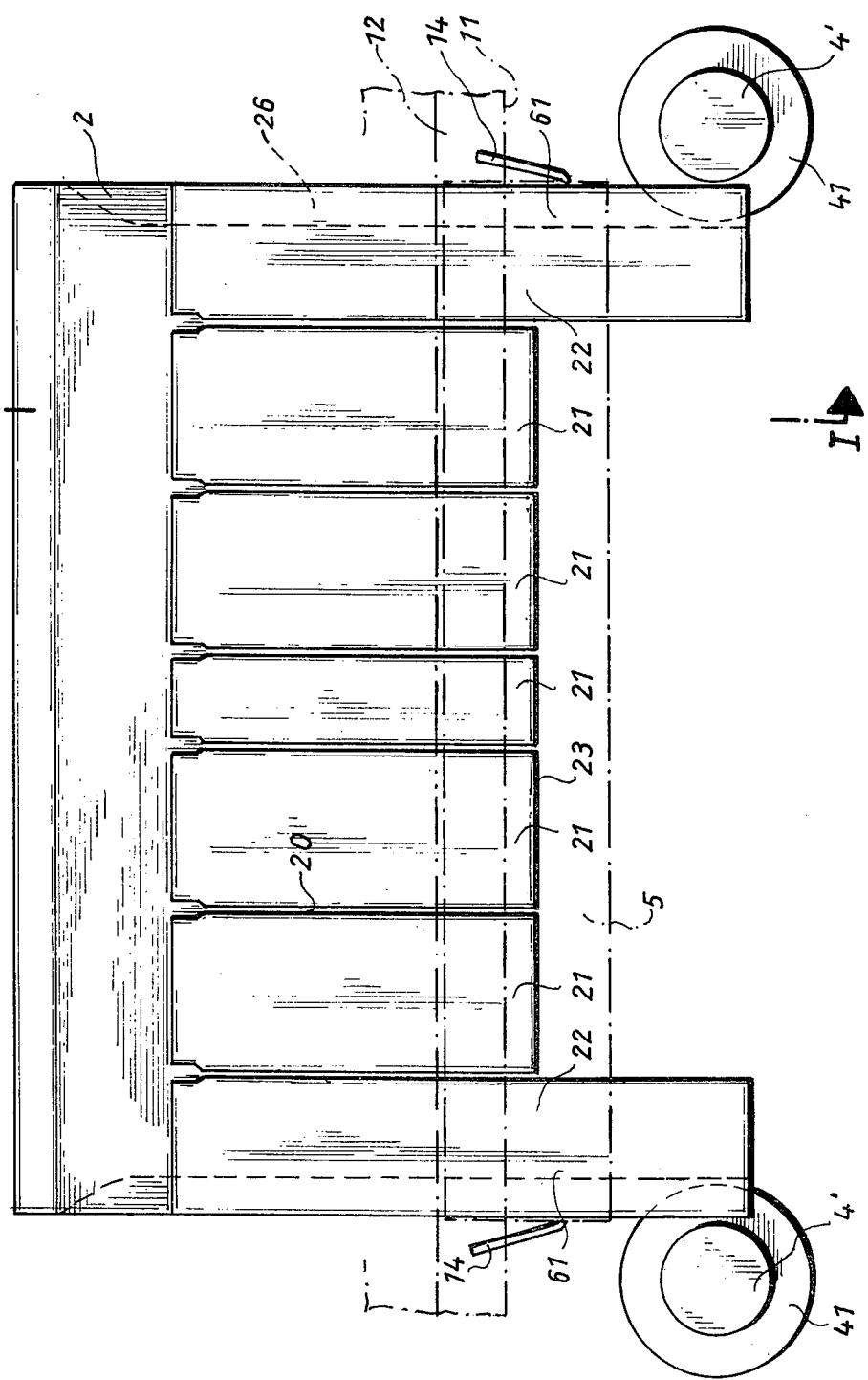
FIG. 2 shows elements of the apparatus of FIG. 1 in top plan view and partly in phantom view.

Referring now to FIGS. 1 and 2, there is shown the front end of an extruder conventional as far as not explicitly illustrated. The non-illustrated barrel of the extruder holds a screw and carries a die 1 which is formed with an extrusion passage receiving a fixedly mounted mandrel 2. The mandrel is of uniform horizontal width transverse to the direction of extrusion, and its rear end tapers in that direction. The front end is of uniform cross section and much wider horizontally than it is high, as is evident from joint consideration of FIGS. 1 and 2. The front end of the mandrel 2 is slotted. The six slots 20 are spacedly parallel to each other and to the direction of extrusion. They divide the front end of the mandrel into five shorter central fingers 21 and two longer outer fingers 22. The dimensions and the location of the mandrel 2 are such that the mandrel 2 and the die 1 define therebetween a gap which extends in a continuous loop about the mandrel 2 in the extrusion orifice.

The upright front face 11 of the die 1 is partly offset so as to form a recess 12 contiguously adjacent the orifice of the extrusion passage in the front face 11. The bottom face of the recess 12 is cylindrically arcuate about an axis transverse to the direction of extrusion, and a cylindrical roller 5 is mounted on the die 1 in the recess for rotation about the axis of the recess, the mounting bracket being omitted from the drawing. The circumference of the roller 5 bounds a channel through which a foil 3 is fed to the surface of the plastic shape extruded from the die 1 from a supply and feeding mechanism represented in the drawing only by two pinch rollers 7, 8.

A first portion of the feeding channel is of approximately uniform thickness in the plane of FIG. 1 and matches the thickness of the foil with as little clearance as is practical in view of the frictional forces exerted on the foil 3 and the mechanical strength of the latter. A second portion of the channel, tangential to the first portion, is bounded by the roller 5 and respective aligned lips 23 of the mandrel fingers 21 which project beyond the extrusion orifice and taper in the direction of extrusion. The width of the second channel portion in a direction radial to the axis of rotation of the roller 5 is approximately equal to the combined corresponding widths of the extrusion gap between the mandrel 2 and the die 1 and of the first channel portion so that the foil 3 is superposed on the planar top face 61 of the extrudate 6 in the second channel portion with sufficient pressure to cause adhesion. The foil 3, for this purpose, may be coated with a pressure-sensitive or a heat-sensitive adhesive chosen to match the materials to be joined.

The width of the foil 3 may be greater than the width of the mandrel 2 and of the roller 5 so that the foil projects laterally beyond the extrudate 6 outside the extrusion orifice. The foil 3, adhesively secured to the extrudate, moves with the latter under the action of the extrusion screw, not shown, in the non-illustrated barrel. Deflector blades 14, fixedly mounted on the die 1, bend the edge portions of the foil 3 downward toward the side faces of the outer mandrel fingers 22. Pressure rollers 4, 4' are located near the portions of the side faces which project beyond the central mandrel fingers 21. They rotate on non-illustrated brackets on the die 1 about vertical axes. A radial flange 41 on each roller 4, 4' extends into a longitudinal groove 26 in the side of the associated finger 22 and drapes an edge of the foil 3 over the side face of the extrudate and into the groove 26, thereby also shaping the extrudate. If only the top face 61 of the extrudate 6 is to be covered with foil, and the foil has a width not greater than that of the mandrel 2, the rollers 4, 4' may be omitted.

Figure 3:
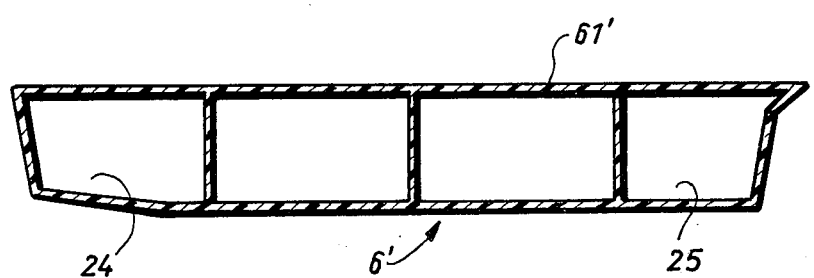
FIG. 3 is a cross section of an extrudate formed on a modified mandrel analogous to the mandrel shown in the extrusion apparatus of FIGS. 1 and 2.

The mandrel 2 as a whole and its fingers 21, 22 are of rectangular cross section, but other shes are known in themselves and may be chosen accordingly. The cross section of a modified die and of the cooperating die orifice is evident from FIG. 3 which shows the extrudate as it leaves the modified extrusion gap. The mandrel has four fingers separated by three slots which connect portions of the gap defined between the die and the mandrel in the orifice and shaping the outer skin 61' of the extrudate 6'. The two inner mandrel fingers, not themselves seen in FIG. 3, are of rectangular cross section. One outer finger, shaping an edge portion 24 of the extrudate, has a top face flush with the top faces of the inner fingers, but its side face and bottom face converge at an obtuse angle. The other outer mandrel finger which forms the other edge portion 25 of the extrudate 6' has a similar shape, but additionally a rib laterally projecting from its top face beyond the side face.

Figure 4:
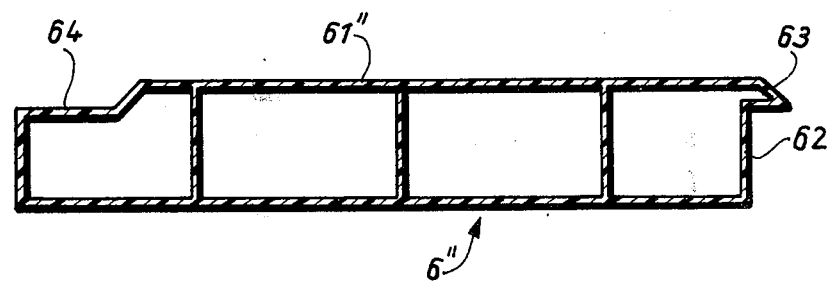
FIG. 4 shows the extrudate of FIG. 3 after supplemental shaping in a calibrating die.

The extrusion apparatus shown in FIG. 1 includes a sizing and calibrating apparatus 9, conventional in itself and not shown in detail, through which the extrudate is drawn while still plastically deformable. The shape of the sizing die employed in the apparatus 9 in conjunction with the mandrel indirectly illustrated in FIG. 3 is evident from FIG. 4 which shows the extrudate of FIG. 3 after its passage through the sizing die. The strand 6" ultimately discharged from the sizing apparatus 9 differs from the extrudate 6' by a stepped down portion 64 in its top face 61" and by the shape of the laterally projecting rib 63 whose bottom face now is perpendicular to a side face 62 of the strand, itself perpendicular to the top face 61". The length of the loop formed by the outer skin of the product is unchanged during sizing so as not to interfere with adhesion of the foil coating which is too thin to permit pictorial representation on the scale of FIGS. 3 and 4. As finished in the sizing die, the strand of hollow plastic may be cut into individual lengths for use as siding for a building, each rib 63 being horizontal in the installed siding and overlapping the stepped down portion 64 of the subjacent length of siding.

It should be understood, of course, that the foregoing disclosure relates only to preferred embodiments of the invention and that it is intended to cover all changes and modifications of the examples of the invention herein chosen for the purpose of the disclosure which do not constitute departures from the spirit and scope of the invention set forth in the appended claims.

I claim:
1. Extrusion apparatus comprising:
   a. a die member formed with a passage extending therethrough in a predetermined direction of extrusion,
      1. said die member having a front face transverse to said direction,
      2. said passage terminating in an orifice in said front face;
   b. a mandrel member secured in said passage,
      1. said members defining an extrusion gap therebetween in said orifice,
      2. said gap extending about said mandrel member in a closed loop,
      3. said front face being formed with a recess contiguously adjacent said orifice,
      4. said recess being of substantially cylindrically arcuate cross section about an axis transverse to said direction,
      5. said mandrel member being formed with at least one slot therethrough open in said direction of extrusion and transversely to said direction,
      6. said at least one slot connecting two portions of said gap and separating a plurality of finger portions of said mandrel member,
      7. one of said finger portions projecting outward of said orifice beyond another finger portion of said mandrel member, said one finger portion having a side face extending in said direction of extrusion and transverse to said axis;
   c. a cylindrical roller mounted in said recess for rotation about said axis,
      1. said roller defining a first portion of a channel jointly with said die member in said recess and a second portion of said channel with said mandrel member,
      2. said second portion being tangential to said first portion in a plane perpendicular to said axis,
      3. said portions directly communicating with each other;
   d. feeding means operatively associated with said first portion for feeding a foil to said first portion; and
   e. means adjacent said mandrel member for draping a foil fed to said first portion of said channel by said feeding means about said side face of said one finger portion.

2. Apparatus as set forth in claim 1, wherein the width of said second portion of said channel in a direction radial to the direction of rotation of said roller is substantially equal to the combined corresponding widths of said gap and of said first portion.

3. Apparatus as set forth in claim 1, wherein said mandrel member has a planar face opposite said roller member.

* * * * *